(12) United States Patent
Martin

(10) Patent No.: US 9,832,794 B2
(45) Date of Patent: Nov. 28, 2017

(54) COMMUNICATIONS DEVICE AND METHOD FOR IMPROVING THE TRANSMISSION OF RANDOM ACCESS MESSAGES

(71) Applicant: SONY CORPORATION, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/914,445

(22) PCT Filed: Sep. 3, 2014

(86) PCT No.: PCT/EP2014/068733
§ 371 (c)(1),
(2) Date: Feb. 25, 2016

(87) PCT Pub. No.: WO2015/039870
PCT Pub. Date: Mar. 26, 2015

(65) Prior Publication Data
US 2016/0219626 A1    Jul. 28, 2016

(30) Foreign Application Priority Data

Sep. 20, 2013 (EP) .................................... 13185460

(51) Int. Cl.
*H04W 74/08* (2009.01)
*H04W 28/02* (2009.01)
(Continued)

(52) U.S. Cl.
CPC ... *H04W 74/0833* (2013.01); *H04W 28/0205* (2013.01); *H04W 28/0221* (2013.01);
(Continued)

(58) Field of Classification Search
CPC .......... H04W 74/0833; H04W 74/004; H04W 28/0221; H04W 74/085; H04W 28/0205;
(Continued)

(56) References Cited

U.S. PATENT DOCUMENTS 6,690,661 B1 * 2/2004 Agarwal .................. H04L 1/16
370/337
7,899,404 B2 * 3/2011 Kornprobst ............. H04L 1/188
370/448
(Continued)

FOREIGN PATENT DOCUMENTS

EP    1 035 745 A1    9/2000
EP    1 198 076 A1    4/2002
(Continued)

OTHER PUBLICATIONS

International Search Report dated Feb. 12, 2015 in PCT/EP2014/068733.
(Continued)

*Primary Examiner* — Brian O'Connor
(74) *Attorney, Agent, or Firm* — Oblon, McClelland, Maier & Neustadt, L.L.P.

(57) ABSTRACT

A communications device to transmit data to a mobile communications network includes one or more network elements providing a wireless access interface for communication. The communications device includes a controller controlling a transmitter to transmit a random access message to a first network element via a random access channel of the wireless access interface common to one or more other communications devices, to receive in response an acknowledgement indicating an allocation of communications resources of a shared up-link channel for the communications device to transmit signals to the mobile communications network, or a negative acknowledgment indicating the communications device has not been allocated commu-
(Continued)

nications resources of the shared up-link channel. After detecting random access failure conditions by the controller, the controller in combination with the transmitter re-transmits the random access message one or more times, with a variable delay greater than or equal to a delay of a previous re-transmission.

12 Claims, 11 Drawing Sheets

(51) Int. Cl.
  *H04W 74/00* (2009.01)
  *H04W 56/00* (2009.01)
  *H04W 72/04* (2009.01)

(52) U.S. Cl.
  CPC ....... *H04W 74/004* (2013.01); *H04W 74/085* (2013.01); *H04W 56/0005* (2013.01); *H04W 56/0015* (2013.01); *H04W 56/0045* (2013.01); *H04W 72/042* (2013.01); *H04W 72/0413* (2013.01)

(58) Field of Classification Search
  CPC ........... H04W 72/042; H04W 72/0413; H04W 56/0045; H04W 56/0015; H04W 56/0005
  See application file for complete search history.

(56) References Cited

U.S. PATENT DOCUMENTS

| | | | | |
|---|---|---|---|---|
| 8,688,166 B2* | 4/2014 | Gupta | ................. | H04W 76/027 455/435.2 |
| 8,718,667 B2* | 5/2014 | Song | ................. | H04W 74/0833 370/252 |
| 8,885,583 B2* | 11/2014 | Yamada | ............ | H04W 56/0005 370/329 |
| 9,125,092 B2* | 9/2015 | Das | ....................... | H04W 24/10 |
| 9,326,276 B2* | 4/2016 | Kato | ................. | H04W 72/0413 |
| 2003/0114113 A1 | 6/2003 | Kornprobst | | |
| 2004/0029604 A1 | 2/2004 | Raaf | | |
| 2008/0019311 A1 | 1/2008 | Kornprobst | | |
| 2010/0302934 A1 | 12/2010 | Baker et al. | | |
| 2011/0122850 A1 | 5/2011 | Kornprobst | | |
| 2012/0087308 A1 | 4/2012 | Kornprobst | | |
| 2013/0035084 A1 | 2/2013 | Song et al. | | |
| 2013/0044689 A1 | 2/2013 | Kornprobst | | |
| 2013/0044715 A1 | 2/2013 | Baker et al. | | |
| 2013/0095879 A1 | 4/2013 | Gupta et al. | | |

FOREIGN PATENT DOCUMENTS

EP 2 218 288 8/2010
WO WO 2009/057043 A1 5/2009

OTHER PUBLICATIONS

RAN4: "Performance Requirement for 2/10msec TTI Selection When Operating Enhanced Uplink in CELL_FACH or Idle Mode", 3GPP Draft; R4-124436, 3rd Generation Partnership Project (3GPP), vol. RAN W64, XP050672058, Aug. 2012, 3 pages.
"LTE Aggressive RACH Issues In Heavily Loaded Environments", AT&T, 3GPP TSG-Ran WG2 Meeting #83, Barcelona, Spain, R2-132896, Aug. 19-23, 2013, 2 pages.
"RACH Transmission Failure Issue", NTT Docomo, Inc., 3GPP TSG-Ran WG2 Meeting #82, Fukuoka, Japan, R2-131892, May 20-24, 2013, 6 pages.
"Our View on the "Chiba issue"—RACH Access Failure", Deutsche Telekom, 3GPP TSG RAN WG2 #82, Fukuoka, Japan , R2-131654, May 20-24, 2013, 2 pages.
"RACH transmission Failure issue", NTT Docomo, Inc., 3GPP TSG-RAN WG2 Meeting #81, St. Julian's, Malta, R2-130436, Jan. 28-Feb. 1, 2013, 3 pages.
"Reduction of PRACH Load due to Persistent RA Preamble Transmission", Ericsson, ST-Ericsson, Alcatel-Lucent, AT&T, Broadcom, InterDigital Communications, Qualcomm Inc., 3GPP TSG-RAN WG 2 Meeting #83, Barcelona, Spain, R2-132884, Aug. 19-23, 2013, 5 pages.
"Reduction of PRACH Load due to Persistent RA Preamble Transmission", Ericsson, ST-Ericsson, Alcatel-Lucent, AT&T, Broadcom, InterDigital Communications, Qualcomm Inc., 3GPP TSG-RAN WG 2 Meeting #83, Barcelona, Spain, R2-132883, Aug. 19-23, 2013, 5 pages.
"Universal Mobile Telecommunications System (UMTS); Medium Access Control (MAC) Protocol Specification (3GPP TS 25.321 version 11.5.0 Release 11)", ETSI TS 125 321 V11.5.0, Jan. 2014, 212 pages.

* cited by examiner

COMMUNICATIONS DEVICE AND METHOD FOR IMPROVING THE TRANSMISSION OF RANDOM ACCESS MESSAGES

CROSS-REFERENCE TO RELATED APPLICATIONS

The present application is based on PCT filing PCT/EP2014/068733 filed Sep. 3, 2014, and claims priority to European Patent Application 13 185 460.6, filed in the European Patent Office on Sep. 20, 2013, the entire contents of each of which being incorporated herein by reference.

TECHNICAL FIELD OF THE DISCLOSURE

The present invention relates to communications devices for communicating via a mobile communications network, and methods for communicating.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on.

Whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks.

Generally it is desirable to improve an efficiency with which all types of communications devices access the communications resources of a mobile communications network.

SUMMARY OF THE DISCLOSURE

According to an example embodiment of the present disclosure there is provided a communications device for communicating via a mobile communications network, the mobile communications network including one or more network elements providing a wireless access interface for transmitting signals to and receiving signals from the communications device. The communications device comprises a transmitter configured to transmit signals to the mobile communications network via the wireless access interface provided by the one or more network elements of the mobile communications network, a receiver configured to receive signals from the mobile communications network via the wireless access interface provided by the one or more network elements of the mobile communications network, and a controller. The controller is configured to control the transmitter to transmit a random access message to a first network element via a random channel of the wireless access interface which is common to one or more other communications devices, to receive from the first network element an acknowledgement in response to the random access message providing an indication of an allocation of the communications resources of the shared up-link channel for the communications device to transmit signals to the mobile communications network or a negative acknowledgment providing an indication that the communications device has not been allocated communications resources of the shared up-link channel. In response to detection of one or more random access failure conditions by the controller, the controller is configured in combination with the transmitter to re-transmit the random access message one or more times, each re-transmission of the random access message being after a variable delay which is greater than or equal to the delay of a previous re-transmission for each re-transmission.

A communications device which is configured to operate in accordance with the present technique can be arranged to perform a random access procedure, by transmitting a random access message in a random access channel of a wireless access interface, which reduces the likelihood of congestion on the random access channel caused by other communications terminals transmitting random access messages contemporaneously. In some examples, a large number of communications devices may be operating within a cell served by a network element. If a significant number of these devices are caused to access communications resources provided by the network element contemporaneously, by transmitting random access messages, then congestion may occur because of the limited bandwidth of the random access channel, processing power of the network element or a limited bandwidth of the mobile communications network. Accordingly by re-transmitting a random access message after this has neither been acknowledged or negatively acknowledged (no response) such as might occur if the network element is not able to cope with a volume of random access messages, then by increasing the delay between re-transmissions of the random access messages, there is a greater likelihood that the congestion will clear enough for a response to be transmitted to the network element.

The random access message transmitted by the communications device may include or be comprised of a preamble or random access preamble. In one example the random access preamble may be provided to the communications device by the mobile communications network.

In some examples each of the predetermined times before the re-transmission of the random access response message is comprised of a minimum delay and a randomly generated delay period so that in combination the delay is greater than or equal to the delay for a previous re-transmission for each of the one or more re-transmissions. Accordingly there is provided an arrangement in which each of one or more other communications devices are arranged to re-transmit one or more other random access messages at different times to the time of transmission of the communications device.

Various further aspects and embodiments of the invention are provided in the appended claims.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Conventional Network

Figure 1:
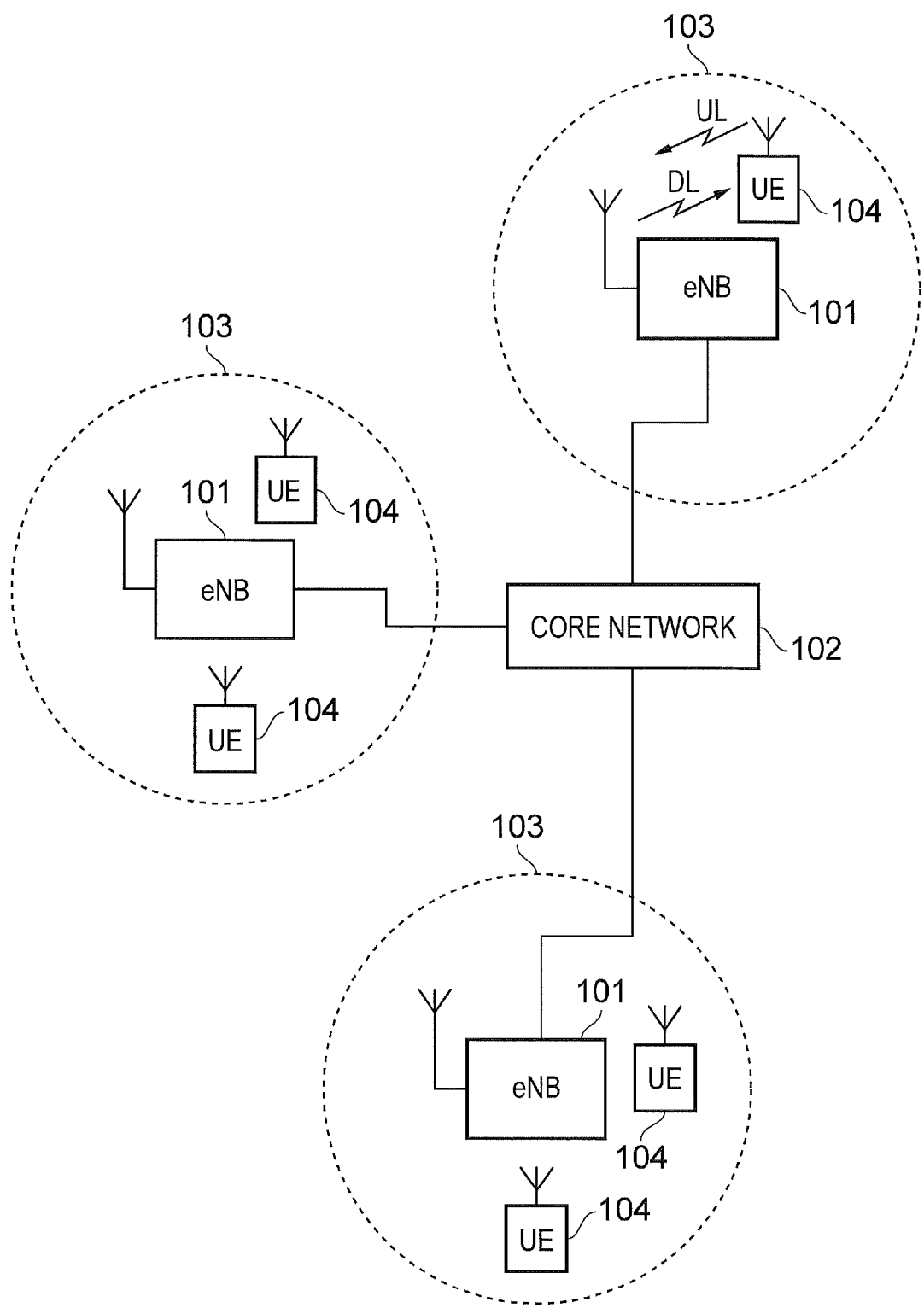
FIG. 1 provides a schematic diagram illustrating an example of a conventional mobile telecommunication network.

FIG. 1 provides a schematic diagram illustrating the basic functionality of a conventional mobile telecommunications network.

The network includes a plurality of base stations 101 connected to a core network 102. Each base station provides a coverage area 103 (i.e. a cell) within which data can be communicated to and from mobile terminals 104. Data is transmitted from a base station 101 to a mobile terminal 104 within a coverage area 103 via a radio downlink. Data is transmitted from a mobile terminal 104 to a base station 101 via a radio uplink. The core network 102 routes data to and from the mobile terminals 104 and provides functions such as authentication, mobility management, charging and so on. The mobile terminals may also be referred to as user equipment (UE) or communications devices and the base stations as enhanced node B (eNodeB) or network elements.

Figure 2:
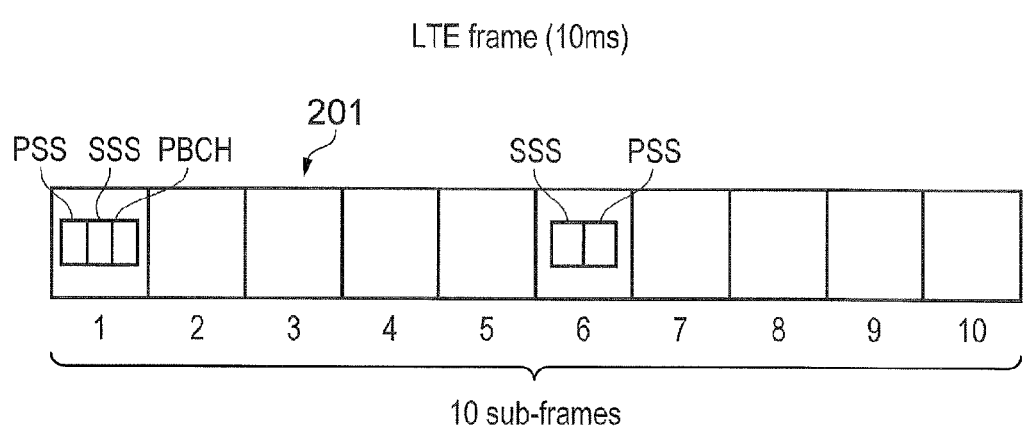
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
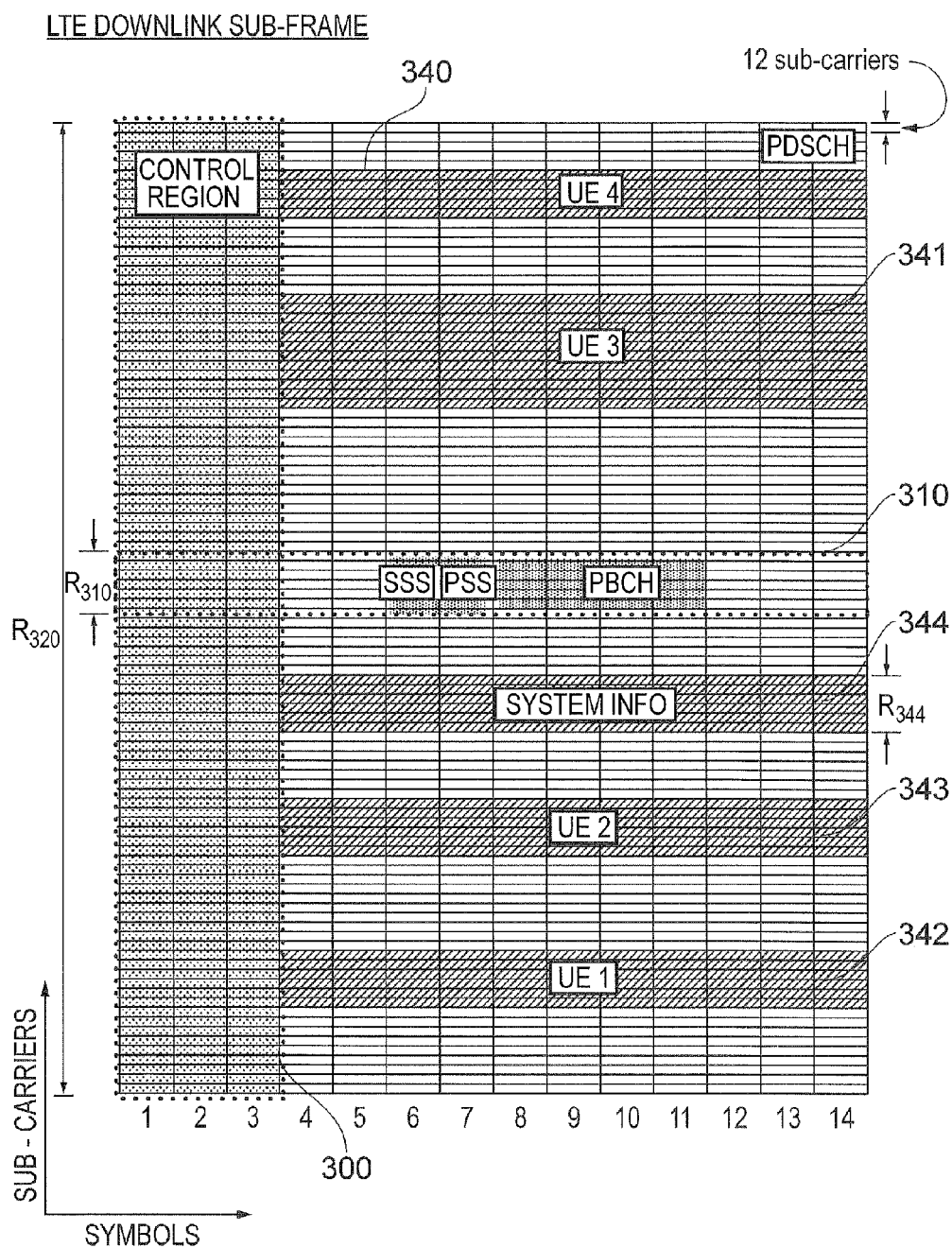
FIG. 3 provides a schematic diagram illustrating an example of a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers, the resource allocation 343 for a second LTE terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific communications terminals (UEs). Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH) mentioned above. This central band 310 is typically 72 sub-carriers wide (corresponding to a transmission bandwidth of 1.08 MHz). The PSS and SSS are synchronisation sequences that once detected allow a communications terminal 104 to achieve frame synchronisation and determine the cell identity of the base station (eNodeB) transmitting the downlink signal. The PBCH carries information about the cell, comprising a master information block (MIB) that includes parameters that the communications terminals require to access the cell. The data transmitted to individual communications terminals on the physical downlink shared channel (PDSCH) can be transmitted in the remaining blocks of communications resource elements of the sub-frame.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications terminal.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional communications terminal must be able to receive the entire bandwidth of the sub-frame in order to receive and decode the control region.

In examples where the network of FIG. 1 operates in accordance with LTE, the UEs 104 will be allocated resources in uplink frames by the eNodeB 101. For example, if a UE is in an unconnected state with the eNodeB and wishes to connect to the eNodeB, the UE is required to perform a random access procedure which acts as request for access to the network.

LTE Random Access Procedure

Figure 4A:
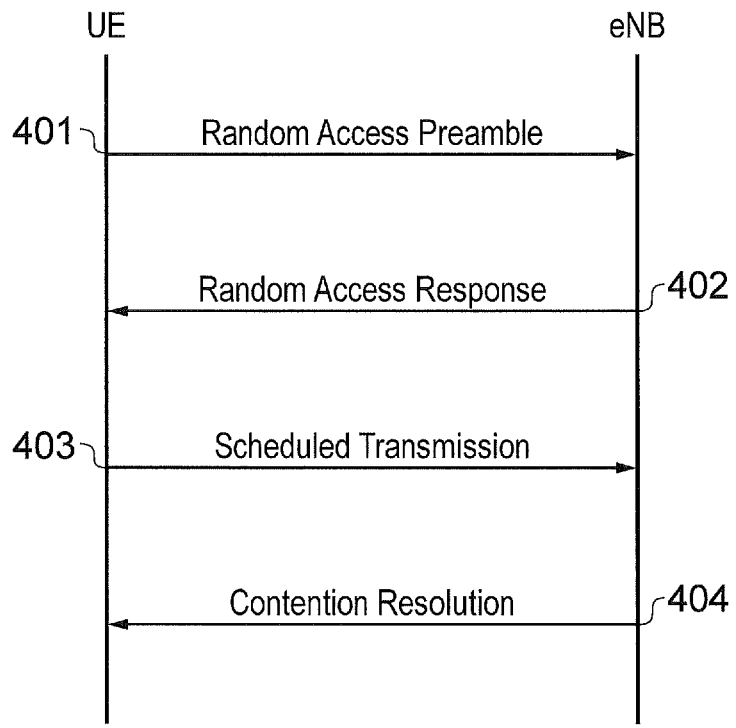
FIGS. 4a and 4b provide schematic diagrams of LTE random access procedures.

FIG. 4a illustrates an LTE contention based random access procedure that a UE may perform in order to request access to an LTE network. Firstly, the UE selects a random access preamble from a set of contention based random access preambles that has been broadcast in a system information block (SIB) such as SIB2 in a downlink frame by the eNodeB. The UE transmits the selected random access preamble 401 as a random access message to the eNodeB where this transmission acts as an access request message for requesting access to and resources of the network, and the preamble acts as a UE identifier. The random access preamble may be transmitted on a physical channel within the wireless access interface such as a physical random access channel (PRACH) of an uplink frame. Once the random access preamble has been received by the eNodeB, at step 402 the eNodeB transmits and the UE receives a response message, such as for example, a random access response (RAR) which provides a positive or negative acknowledgment with regards to a resource allocation. The resources in time and frequency of a physical downlink shared channel (PDSCH) in which the UE can find the RAR are indicated in a control message on a control channel such as physical downlink control channel (PDCCH). The control message is addressed to a random access radio network temporary identifier (RA-RNTI) and is transmitted in the same subframe as the response message. This control message is therefore required to be received prior to receiving the response message. In particular, a downlink control information (DCI) message informing the UE of the resources where the response message can be found in the current subframe is sent on the PDCCH, where the RA-RNTI is formed from a time and, in some examples, a frequency identifier of transmission of the associated access request message. The response message contains at least the identity of the received preamble, a timing alignment command, an allocated uplink resource grant and a temporary Cell RNTI (C-RNTI). Upon receiving the response message, the UE transmits a scheduled transmission containing its intended message, such as a radio resource controller (RRC) connection request, in the allocated uplink resources as shown by step 403. Finally at step 404, upon receiving the intended message, the eNodeB transmits a contention resolution message. The contention resolution message is then acknowledged by the UE to which the contention resolution message is addressed, for example with a HARQ ACK/NACK. This procedure thus overcomes the possibility of multiple UEs utilising the same preamble and or transmitting a random access request over the same channel at the same time.

Figure 4B:
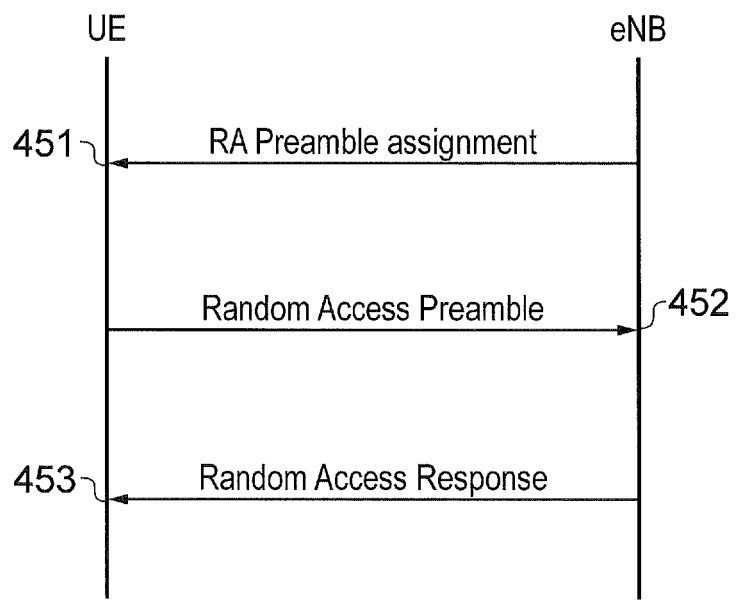

FIG. 4b illustrates an example non-contention based random access procedure for requesting resources in an LTE network. At step 451, prior to the transmission of a random access preamble from the UE in the random access message, the eNodeB allocates a preamble from a non-contention based set of preambles to the UE. This allocation may be performed via a format 1A downlink control information (DCI) message on the PDCCH or in a handover command if the UE has recently entered a cell served by the eNodeB. At step 452 the user device transmits its allocated preamble to the eNodeB. Once the preamble has been received at the eNodeB, the eNodeB transmits a response message, such as for example a random access response (RAR), at step 453 where the response message contains similar information to the response message sent at step 402 of FIG. 4a. Once the response message has been received at the UE, the user device then transmits its intended message in the allocated uplink resources indicated in the response message.

Although the access request procedures of FIGS. 4a and 4b has been described with reference to sending and receiving messages directly from a eNodeB, the messages may also be sent and received via one or more relays using the same procedure.

Response Windowing

Both access request procedures described above are reliant on reception of the preamble at the eNodeB and the reception of a response message at the UE. In an LTE system the response message is transmitted on a physical downlink shared channel (PDSCH) and is scheduled by information on a physical control channel such as a PDCCH. In order to ensure that a UE does not attempt to receive a response message continuously from the point in time of the transmission of the access request message until a response is received, the response message is transmitted by the eNodeB in a predetermined temporal response message window. When the access request message is a random access request and the response message is a random access response, such a window may be referred to as a random access response window or a RAR window. A response window may reduce the amount of power consumed at the UE because a finite time period during which the UE will attempt to receive a response message is defined. The response window is defined with respect to the transmission of the access request message and the UE is configured to begin to attempt to receive the response message when the response window commences. The process of receiving a response message includes the UE checking the PDCCH of each subframe within the response window for a relevant DCI containing PDSCH scheduling information addressed to its RA-RNTI. When such scheduling information is found, the UE receives and decodes the response message in the PDSCH of the corresponding subframe, where the response message contains an indication of the preamble the user device sent to the eNodeB in the access request message. Once a response message is successfully received the UE ceases to check the PDCCH for response message scheduling information. If a response message is not received by a HE within the response window, after a minimum wait period the user device begins a subsequent new access request procedure, where the subsequent access request procedure is similar to those previously described with reference to FIGS. 4a and 4b. Multiple response messages for different UEs may be transmitted by the eNodeB within each response window therefore reducing congestion. If multiple response messages are present in a single response window the user devices may differentiate between them by means of the RA-RNTI to which they are addressed and the preamble they each contain.

Although the procedure above provides a method to increase the likelihood of a response message sent by the eNodeB being received by an UE, it does not provide a robust procedure for transmitting the preamble in the initial random access request. For example, in some scenarios a large number of UEs may contemporaneously transmit a random access message in the form of random access preamble to a same eNodeB. One example where this may occur is when a large number of machine-type-communication (MTC) devices, such as utility meters, attempt to report an event such as a power outage. Another example is where there may be a larger number of conventional communication devices in one location than are normally served at that location, for example because of a sporting event. In such scenarios the eNodeB may be unable to process all the random access requests and or the random access request may interfere with each other. This may lead to the eNodeB unsuccessfully processing some or all the random access messages and therefore the requesting UEs may not receive a random access response message in the form of a resource allocation. The default response for a UE when a random access response is not received is to retransmit the random access message and increase the power at which it is transmitted, and continue this repetition until a timer (T300) expires, the timer expiry indicating that a radio resource controller connection has failed to be established. However, this default response will exacerbate the problems caused by large numbers of UEs attempting to access an eNodeB and request resources because the retransmitted messages will cause additional congestion in both the wireless access interface and at the eNodeB, thus increasing the interference caused by the retransmitted messages.

A second example where the conventional random access procedure lacks robustness is when the uplink and downlink paths to and from the UE and eNodeB are significantly different and therefore the UE camps on to the incorrect eNodeB. This scenario may occur for instance when the downlink signal is received at the UE at an artificially high power. A problem such as this has been known to occur in the proximity of a lakes which are situated in between an eNodeB and a UE. In such circumstances, in the downlink the reflection of the signal from the lake causes the received signal at the UE to be received at a high amplitude. Consequently, the UE will select this eNodeB as the network element to communicate with. However, in the uplink the signal from the UE to eNodeB may be received at a low power or not received at all at the eNodeB. Consequently, if the UE has made a random access request it is possible that the eNodeB will not properly receive it, and hence the UE will not receive a response. This will lead the UE to perform a similar procedure to that described above where it retransmits the random access message and increases the transmission power of the retransmissions. This can in some circumstances cause the UE to fail to obtain any network service, as well as an increase in power consumption at the UE.

A further problem posed by the above limitations of the current random access procedure is that a UE is unlikely to be able to differentiate between the aforementioned problems because the only indicator available at the UE is an absence of a random access response. Consequently, in would be beneficial if an approach which is able to mitigate both of the above problems can be achieved.

Solutions have been proposed to mitigate the adverse effects of the above problems but the solutions have a number of drawbacks. For instance, a proposed solution is for the eNodeB to signal a timer of a fixed duration to the UE or for the UE to use a hard coded timer value to control random access message retransmissions. This timer is triggered when the UE has transmitted a number of random access messages without reply equal to a predetermined threshold. The UE then suspends transmission of further random access messages until the timer has expired. The intention of this delay in transmission is to provide a window to the eNodeB in which it may recover and therefore be in a position to receive and process further random access messages. However, in normal circumstances implementing this "back-off" period may for example result in a call establishment for a UE being delayed even when there is not a congestion or load problem at the eNodeB but instead a temporary issue with uplink coverage. Furthermore, the use of a fixed period may also lead to large number of UEs retransmitting their random access messages at a similar time, thus resulting in the problem being delayed but not solved. Also, using a fixed delay does not take account of the current network conditions which may result in the timers either being too long or too short compared to the congestion in the system. Consequently, it is difficult to configure a timer duration which allows suitable back-off time in cases of high network congestion whilst not causing too much delay to random access request in other cases i.e. low congestion or incorrect cell selection.

A solution proposed to rectify UEs incorrectly selecting an eNodeB due to artificially high downlink signals, is to apply an eNodeB reselection offset so that when a UE detects repeated random access request failures, the UE selects a different eNodeB. For instance, if the eNodeB providing the strongest downlink signal is not responding to repeated random access messages the UE may select an alternative eNodeB from which it receives a downlink signal based on the received signal strength of the new eNodeB being at least a predetermined proportion lower than the previous eNodeB.

Although these approaches may mitigate some of the issues discussed above, they also have a number of significant disadvantages. For instance, it is unknown to a UE which experiences a failed random access request whether the failure has occurred due to incorrectly camping onto an eNodeB or due to congestion in the wireless access interface or at the eNodeB. Consequently, the aforementioned techniques are unlikely to be suitable for widespread implementation.

Variable Delay Preamble Transmission

In accordance with the present disclosure, a UE adapts its back-off behaviour and or cell reselection behaviour in order to manage situations where repeated random access messages are not acknowledged and therefore the random access request unsuccessful.

In accordance with a first example embodiment, a UE applies a variable back-off or delay timer when a random access failure condition is detected and increases the back-off time on subsequent random access message transmissions by a fixed or predetermined increment.

Figure 5:
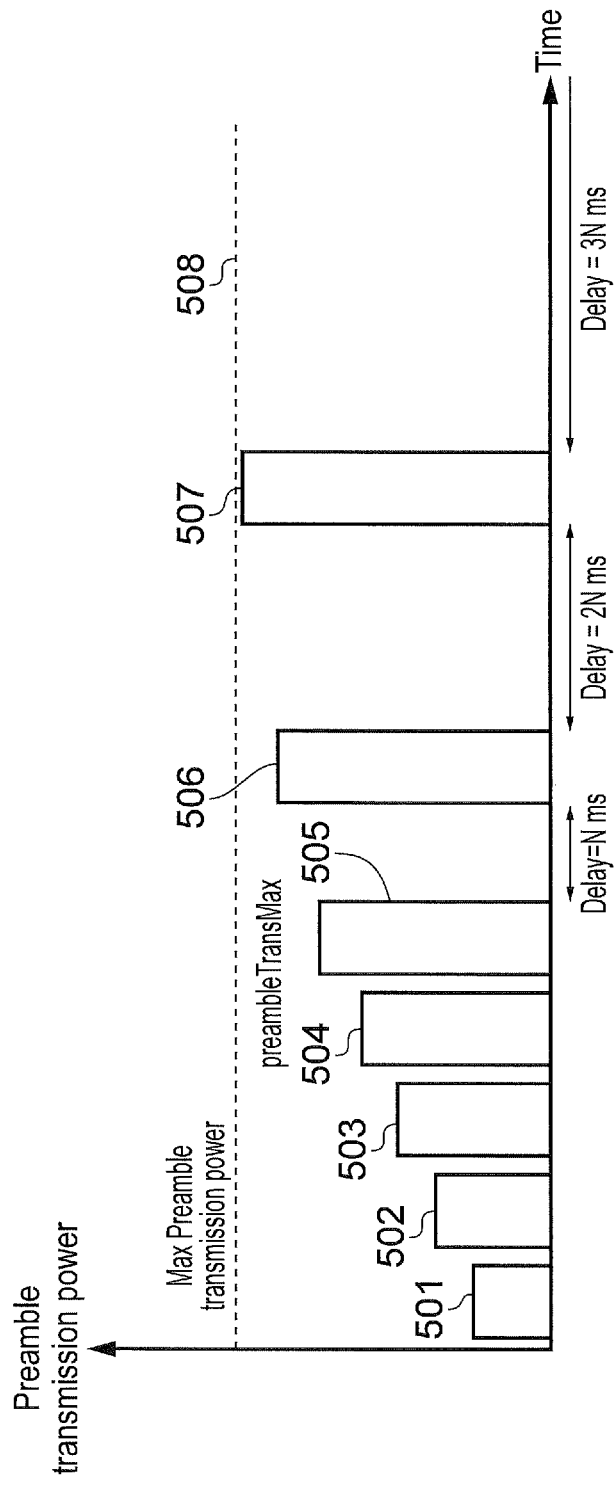
FIG. 5 provides a schematic diagram of a variable delay preamble transmission scheme in accordance with an example of the present invention.

FIG. 5 provides a schematic diagram representing a back-off approach in accordance with the first example embodiment. In FIG. 5 the y-axis represents the power at which a preamble is transmitted as a random access message and the x-axis represents the time at which the preambles are transmitted as a random access message. Initially the UE operates in accordance with the LTE standard, for example the UE transmits a first preamble at 501. However, this first transmission does not result in a random access response from the eNodeB and therefore the UE retransmits the preamble at 502 at an increased power. This process continues such that the preamble is retransmitted at 503, 504 and 504 until the preambleTransMax threshold is reached. Reaching this threshold represents a random access failure condition and therefore once this threshold is reached the UE delays a subsequent retransmission by N ins thus next retransmitting the preamble at 506. In FIG. 5 the preamble transmission 506 is shown to be transmitted at an increased power compared to the previous preamble transmission because the maximum transmit power 508 has yet to have be reached. However, in some examples the maximum transmission power may have already been reached by preamble transmission 505 and therefore no further increase would be possible. Alternatively, the transmission power may only be increased every other subsequent preamble retransmission for example or according to any chosen pattern. If preamble 506 also does not result in the UE receiving a random access response a subsequent preamble retransmission occurs at 507. However, the retransmission is delayed by 2N ms relative to the previous retransmission in order to give the eNodeB further time to recover from any congestion. If preamble 507 did not result in a random access response form the eNodeB the preamble would be retransmitted after 3N ms and so on. In FIG. 5 the delay is calculated in accordance with Delay=(premableTransmissionCounter−premableTransMax)×premableTransMaxDelay however the delay may also be calculated in accordance with any appropriate formulae, such as an exponential increase or initial offset formula. A number of example formulae and given below Delay=preambleTransMaxDelayOffset+(premable-TransmissionCounter−premableTransMax)×premableTransMaxDelay Delay=preambleTransMaxDelayOffset+premableTransMax-Delay$^{(premableTransmissionCounter-premableTransMax)}$ Delay=preambleTransMaxDelayOffset×(premableTransmissionCounter−premableTransMax)+premableTransMax-Delay$^{(premableTransmissionCounter-premableTransMax)}$ The present example embodiment allows the UE to begin with a relatively short delay and then increase the delay if a random access response is not received such that once a random access failure condition has occurred, the delays between retransmissions is greater than or equal to the delay between earlier or previous retransmissions. This provides an advantage over the existing approach because the length of the delay is effectively dependent on the congestion of the system and a long delay is not initially used when the UE has no knowledge of the cause of the random access failure. For example, the number repetitions of the preamble transmission is likely to be correlated with the congestion of the network. Therefore the longer delay period gives the network longer to recover, this allows the delay period to automatically adjust to the congestion of the network. Consequently, the use of an unnecessarily long delay for initial preamble retransmissions has been avoided and the delay in establishing a call for example has been reduced. The premableTransMaxDelay may either be signalled in the broadcast system information as described above or may be fixed into the specification and therefore hardcoded into the UEs. However, in some circumstances parameters such as preambleTransMax, premableTransMaxDelay, preamble-TransMaxDelayOffset or the associated equations may be dynamically signalled so that the eNodeB can dynamically control the congestion mitigation techniques.

In some examples, the use of the variable back-off or delay may be dependent on signalling from the eNodeB. For example, an additional signalling bit may be introduced into the broadcast system information which specifies whether a UE being served by the eNodeB should implement a variable delay. This information is preferably included in data structures such as the system information so that the UE can receive the signalling prior to establishing an RRC connection with the eNodeB. Although in FIG. 5 and in later embodiments the random access failure condition is defined as transmitting a predetermined number of preambles, the random access failure condition may also correspond to other scenarios. For example, failing to receive an acknowledgment within a predetermined period of time such as the T300 timer found in LTE.

Figure 6:
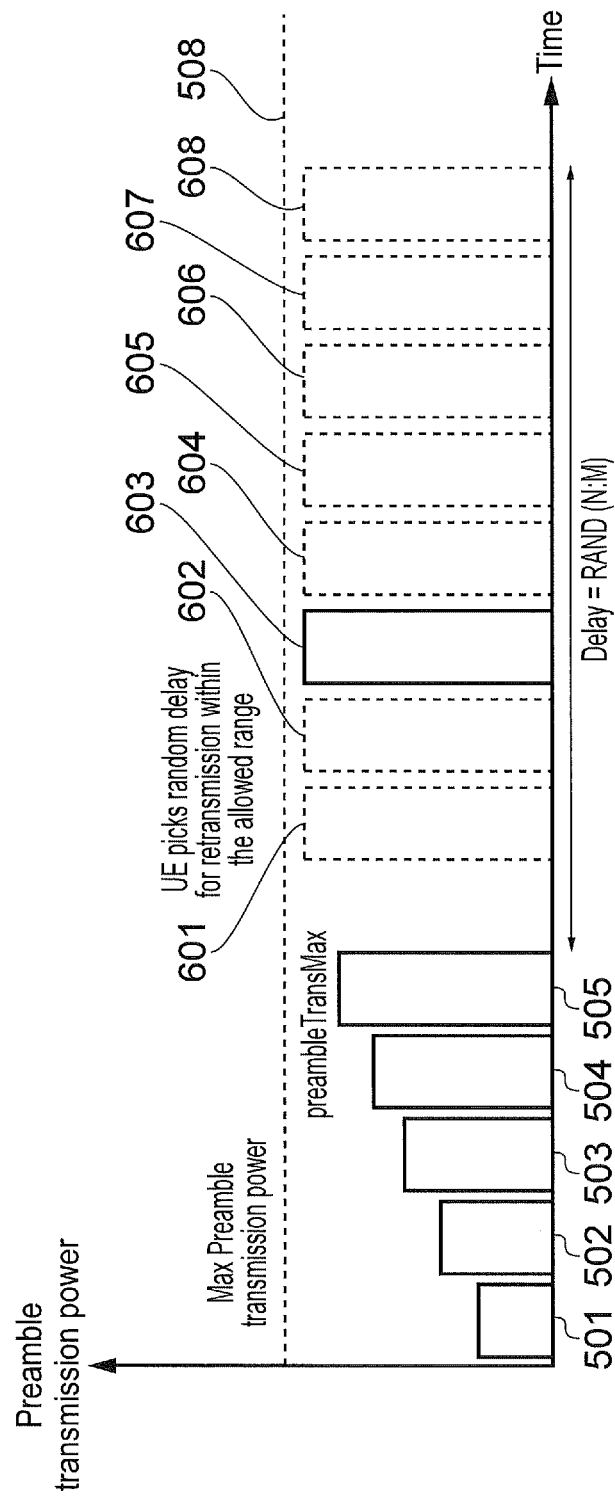
FIG. 6 provides a schematic diagram of a variable delay preamble transmission scheme in accordance with an example of the present invention.

FIG. 6 provides an illustration of a technique in accordance with a second example embodiment, where the UE may randomise the delay with which preambles are retransmitted. As in FIG. 5, the transmission of the initial preambles 501 to 505 are performed as normal and once a random access failure condition occurs i.e. preambleTransMax is reached, an additional delay is introduced before the next retransmission of the preamble. However, the delay which is introduced is randomised. For example the next preamble retransmission may take places at any time in the range represented by 601 to 608 and the decision is a random choice at the UE in accordance with an appropriate probability distribution, for example a uniform distribution. The range may be set according to an appropriate duration, for example the range may be calculated in accordance with any of the formula given below for example.

DelayRange=preambleTransMaxDelayMin:(prem-
   ableTransmissionCounter−premableTransMax)×
   premableTransMaxDelay however the delay may also be calculated in accordance with any appropriate formulae, such as an exponential increase or an initial offset formulae. A number of example formula and given below Delay=preambleTransMax-
   DelayMin: premableTransMax-
   Delay$^{(premableTransmissionCounter-premableTransMax)}$ Delay=preambleTransMaxDelayMin×-
   (premableTransmissionCounter−premable-
   TransMax):premableTransMax-
   Delay$^{(premableTransmissionCounter-premableTransMax)}$ As a further possibility to derive the randomised delay, there may be a fixed minimum delay onto which a randomly generated delay period is added. As an alternative to basing the delay or retransmission time of a subsequent preamble transmission on a random distribution, they could also be dependent upon a UE's identity such as C-RNTI or IMSI. However, randomly determining the delay may be a fairer way to allocate when a UE is to perform a retransmission such that a UE is not consistently allocated one delay or retransmission time.

The use of random back-off provides a number of advantages over existing techniques. Firstly it reduces the chance that preambles which have previously been transmitted contemporaneously with preambles from other UEs (i.e. 501 to 505) will be retransmitted contemporaneously, thus reduced the likelihood of further congestion. Furthermore, the use of a randomised delay also means that UEs may still retransmit preambles whilst others are in a back-off period thus ensuring that not all preamble retransmissions are suspended. A feature of the proposed techniques is that legacy devices will not vary the delay associated with retransmission of preambles and therefore compliant UEs may experience an increased delay compared to legacy UEs. However, the use of a randomised reduces the probability that a compliant UE will experience an increased delay in retransmitting a preamble compared to a legacy device.

Figure 7:
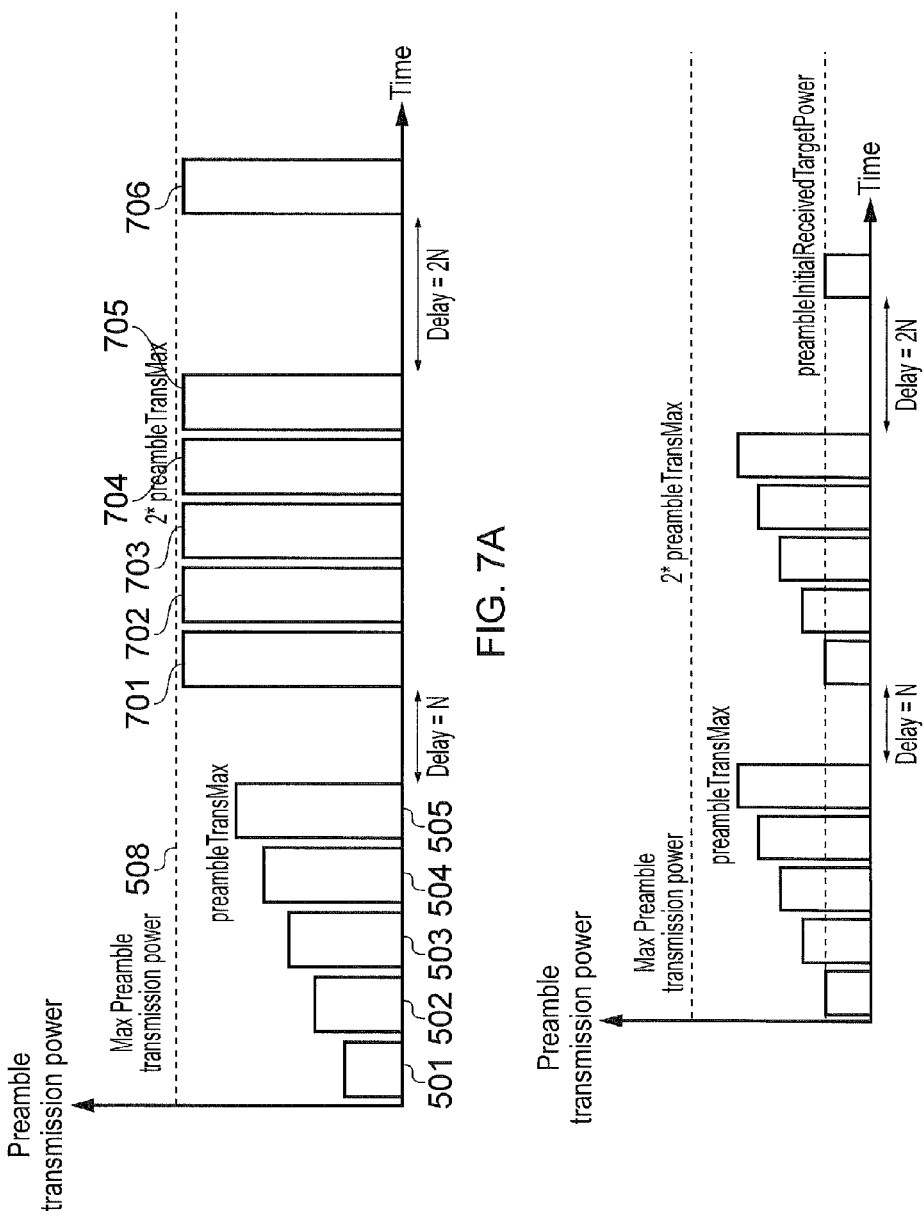
FIG. 7A provides a schematic diagram of a variable delay preamble transmission scheme in accordance with an example of the present invention.
FIG. 7B provides a schematic diagram of a variable delay preamble transmission scheme in accordance with an example of the present invention.

FIG. 7A provides an illustration of a technique in accordance with a third example embodiment of the present disclosure. In this example embodiment, instead of a delay being changed for every subsequent preamble retransmission after a random access failure condition has occurred it is varied after a predetermined number of subsequent preamble retransmissions. For example, the delays illustrated in FIG. 7A are calculated in a manner similar to those of FIG. 5 i.e. N, 2N, 3N etc. however after each delay a group or set of preamble retransmissions take place. In FIG. 7A it can be seen that after the initial five (preambleTransMax) preamble transmissions 501 to 505 and a delay of N ms, a further five preamble retransmissions takes place 701 to 705. If a random access response is still not received, the UE may commence transmitting another set of premableTransMax preambles after a 2N ms delay, the set beginning with preamble transmission 706. The delay in between sets may be calculated according to any of the formula given above and each set of preamble transmissions may be treated as an independent set such that the transmission power of 701 to 705 for example may correspond to that of preamble transmissions 501 to 505. Alternatively the transmission powers may increase until the maximum preamble transmission power is reached and then this power maintained for subsequent preamble transmissions. The approach of the transmission powers increasing until the maximum preamble transmission power is reached and then this power maintained for subsequent preamble transmissions is schematically represented in FIG. 7A. The approach of each set of preamble transmissions being treated as an independent set such that an initial transmission power used for calculating the transmission power for a second set of preamble transmissions corresponds to that of an initial transmission power used for a first set of preamble transmissions is schematically represented in FIG. 7B. FIG. 7B is otherwise similar to, and will be understood from, FIG. 7A.

Reselection of eNodeBs to avoid or rectify incorrect camping-on may be introduced into any of the techniques described. For example, in the technique illustrated in FIG. 7A cell or eNodeB reselection may take place in between the sets of preamble transmissions. For instance, after preamble transmissions 501 to 505 the UE may remove the current eNodeB from it list of candidate eNodeBs and then direct the transmissions 701 to 705 towards a different eNodeB. The current eNodeB may be removed as a result of a default setting that the current eNodeB is removed or may be removed because it signal strength falls above threshold below which the UE is to select a new eNodeB. Alternatively, a negative amplitude offset (reslectionOffset) may be applied to the signals received from the current eNodeB (first eNodeB) and then the eNodeB from which the UE receives the best signal (taking into account the offset and other parameters such as hysteresis and priority) is selected (second eNodeB). This offset then may be removed once the UE moves away from or reselects from the second eNodeB, or after a predetermined period of time, such that the first eNodeB is not permanently excluded from selection. In an alternative approach, a UE may apply any of the above described example embodiments but then perform eNodeB reselection once the T300 timer or multiple instances of the T300 timer have expired. In another approach cell access barring may be applied to prevent a terminal device from seeking to reselect the relevant eNodeB.

Figure 8:
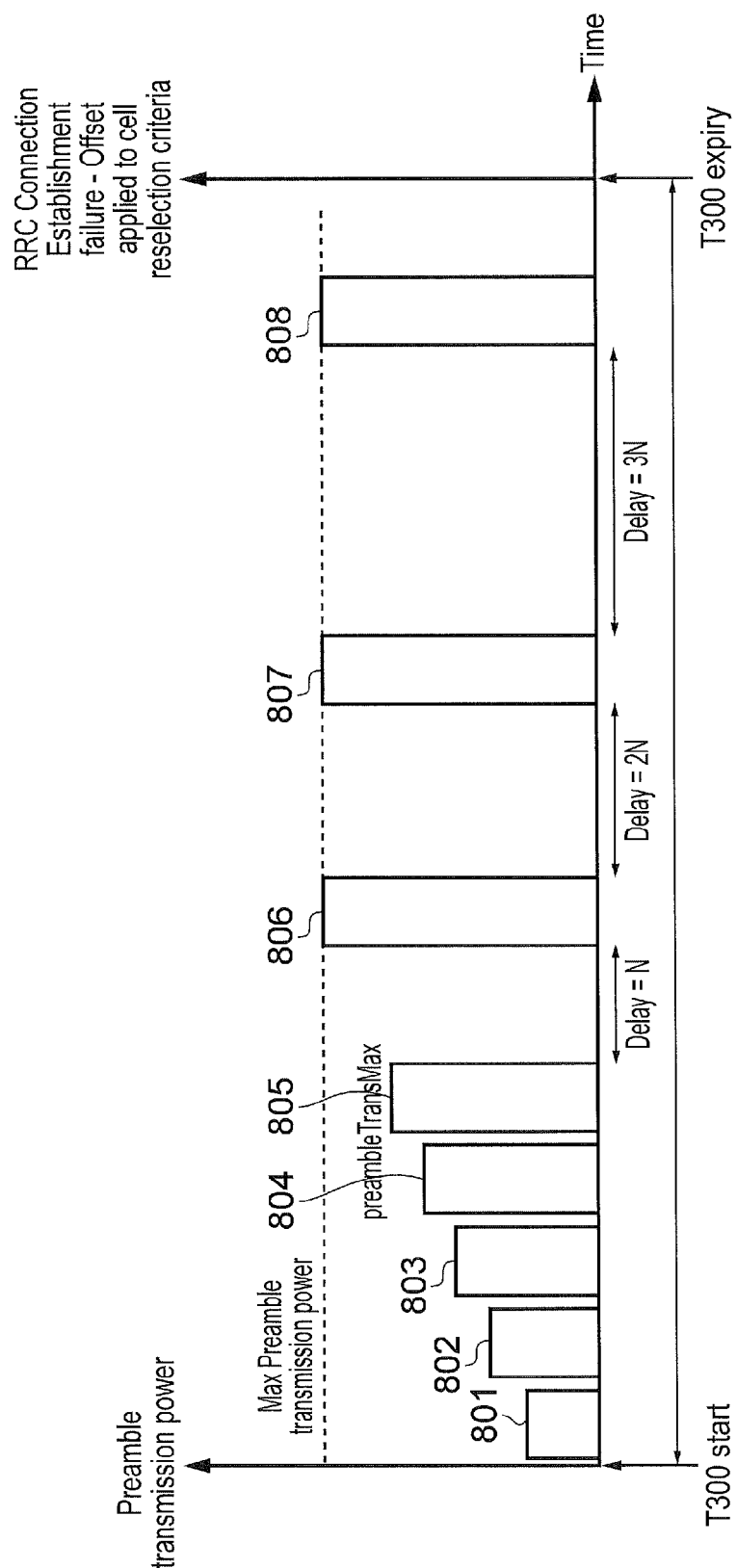
FIG. 8 provides a schematic diagram of a variable delay preamble transmission scheme in accordance with an example of the present invention.

FIG. 8 provides an illustration of a random access procedure where eNodeB reselection is introduced into the technique illustrated in FIG. 5. After preambles 801 to 805 have been transmitted a first random access failure condition occurs, and this triggers the increasing delay between preamble retransmissions as described above. Once preambles 806, 807, and 808 have been transmitted the T300 timer expires thus indicating a second different random access failure condition. In response to this second random access failure condition, the UE performs eNodeB reselection. The network element reselection comprises applying a negative offset to the amplitude of the signals received from the current or first eNodeB and then selecting a second eNodeB to which it will transmit subsequent preambles. This is done by selecting the eNodeB from which it receives what are deemed to be the best signals according to a cell selection or reselection criterion.

As previously described, a UE is unlikely to be able to establish why a random access failure has occurred because in general the only indication available is an absence of a random access response, and this does not allow the UE to differentiate between an overloaded cell or where a cell has been incorrectly selected. The above described technique of integrated reselection and variable delay retransmission overcomes this problem by providing an approach which can address both these failure scenarios. For example, when premableTransMax preambles have been transmitted, action to address an overloaded cell is performed whereas when the T300 timer runs out action to address incorrect cell selection is performed.

The above described preamble retransmission techniques and eNodeB reselection techniques require a number of parameters to be provided to the UEs. These parameters may either hardcoded into UEs or may for example be signalled to UE in the broadcast system information messages transmitted by the eNodeB. In the case where the parameters are provided in the system information they may be provided in a new information element. Such an information element may include one or more of premableTransMaxDelay, reslectionOffset, premableTransMax and premableTransMaxDelayOffset. In one example of premableTransMaxDelay and reslectionOffset may be broadcast together so that signalling overheads in a system are reduced. In some examples UEs may be provided with default values for the above mentioned parameters, these default parameters may be used until the network broadcasts new values which are intended to override the default values. As a further alternative, the technique proposed in this disclosure may only be applied by a UE if a serving eNodeB indicates to a UE that they should be applied. This approach can once again be achieved by introducing further signalling into a broadcast message.

Figure 9:
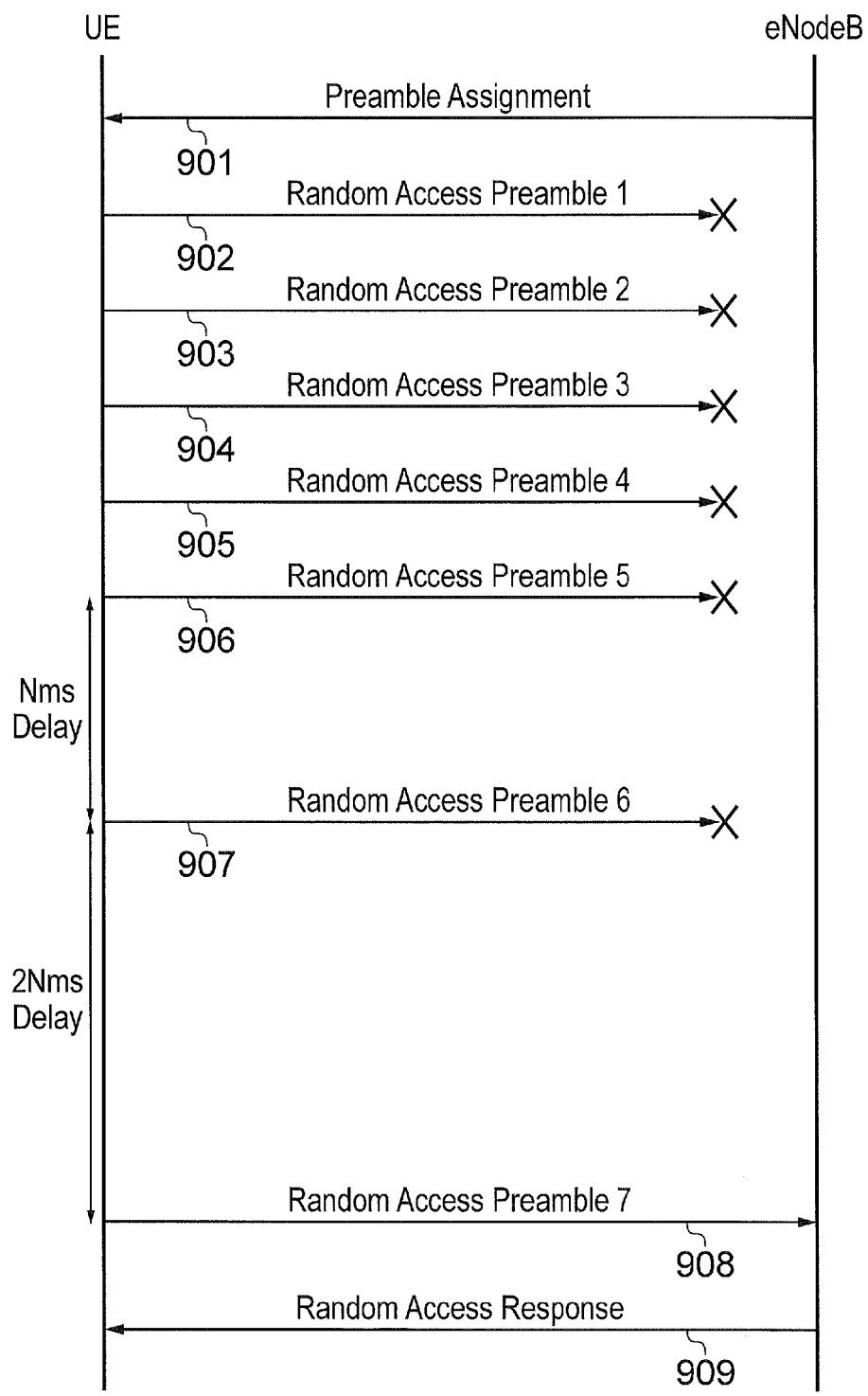
FIG. 9 provides a schematic diagram of a variable delay preamble transmission scheme in accordance with an example of the present invention.

FIG. 9 provides a diagram of the messages exchanged between a UE and eNodeB operating in accordance with the technique described with reference to FIG. 5. The UE first acquires a preamble at 901. The UE then repeatedly transmits the preamble to the eNodeB because a random access response is not received in reply to any of the preamble transmissions 902 to 906. Once the preamble has been transmitted for the fifth time the number of transmissions has reached preambleTransMax. Consequently, the UE delays the next transmission of the preamble 907 by Nms. However, once again this transmission is not successfully acknowledged. The next preamble transmission 908 is therefore delayed by 2N ms. Preamble transmission 908 is then successfully received by the eNodeB and a random access response 909 is received by the UE, thus completing the random access procedure. Although FIG. 9 illustrates a delay which increases as an arithmetic progression the delay may be calculated in accordance with any of the examples described above and multiple preamble transmission may occur between delays as illustrated in FIGS. 7A and 7B. Furthermore, eNodeB reselection may occur during delay period as previously described.

Figure 10:
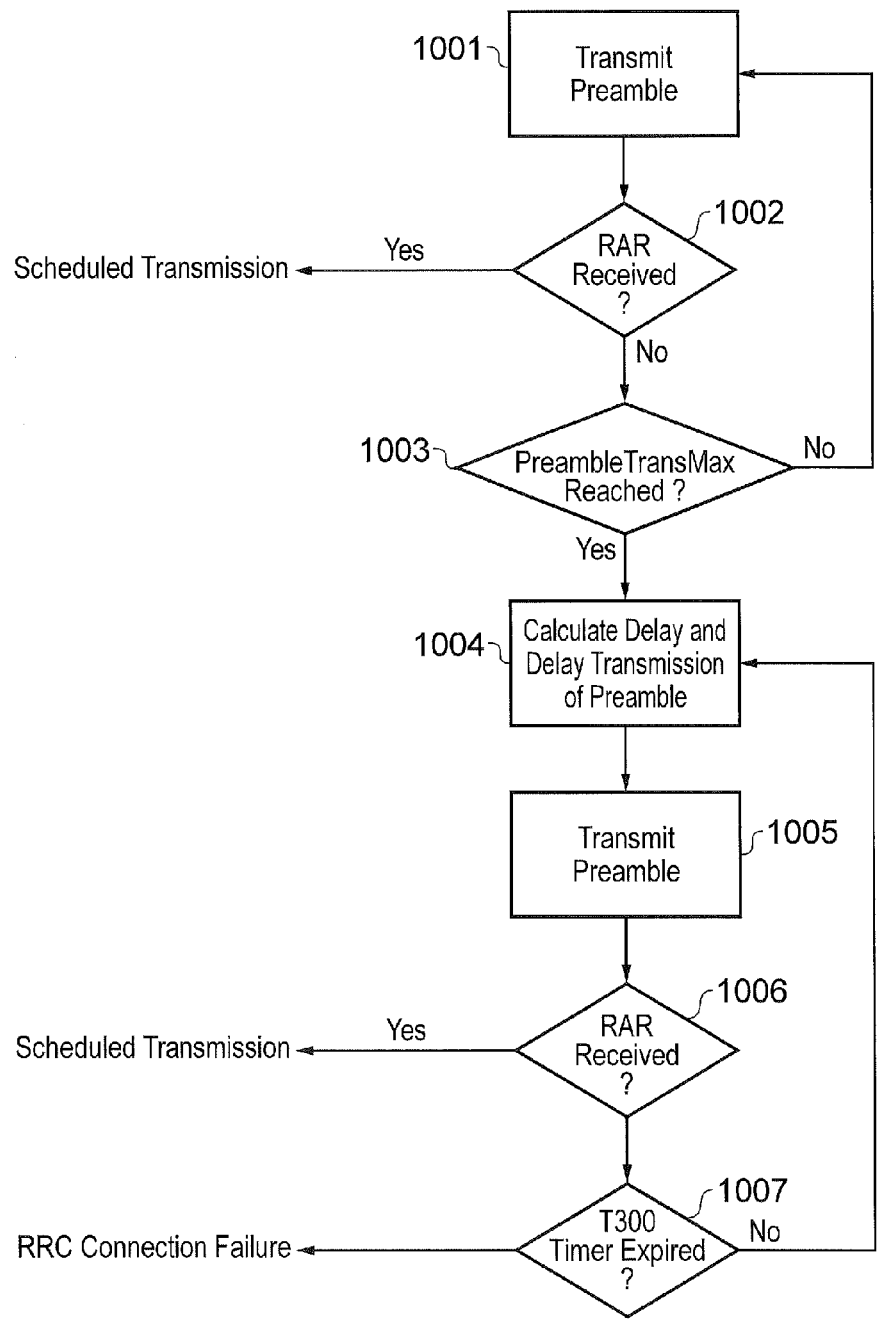
FIG. 10 provides a schematic diagram of a variable delay preamble transmission scheme in accordance with an example of the present invention.

FIG. 10 provides a flow diagram which provides an alternative illustration of the operation at the UE of the technique illustrated in FIGS. 5 and 6. A preamble is initially transmitted at 1001 and if a random access response (RAR) is received from the eNodeB in response 1002, a scheduled transmission occurs and the random access procedure is complete. If a RAR is not received and the number of preamble transmission has not reached preambleTransMax 1003 then the UE performs a further transmission of the preamble 1001. However, if preambleTransMax has been reached 1003 the UE calculates the delay which should be implemented 1004 before the next transmission of the preamble 1005. This process then continues until either a RAR is received 1006 or the T300 timer expires 1007 and the random access procedure is deemed to have failed. Steps of cell reselection, transmission power increase or preamble transmission groupings may also be added to FIG. 10 such that any of the techniques proposed by the present disclosure can be combined. For instance, cell reselection may occur prior to delay calculation if the outcome of step 1003 is "yes".

Although the solutions described above are more complex than existing approaches as a result of the variable delay, the increase in complex is marginal because only a small number of extra mathematical operations are required, for instance the calculation of the delays. Furthermore, the benefits resulting from more reliable random access requests, reduced power consumption, reduced random access congestion and the rectification of incorrect eNodeB selection significantly outweigh the small increase in complexity.

Figure 11:
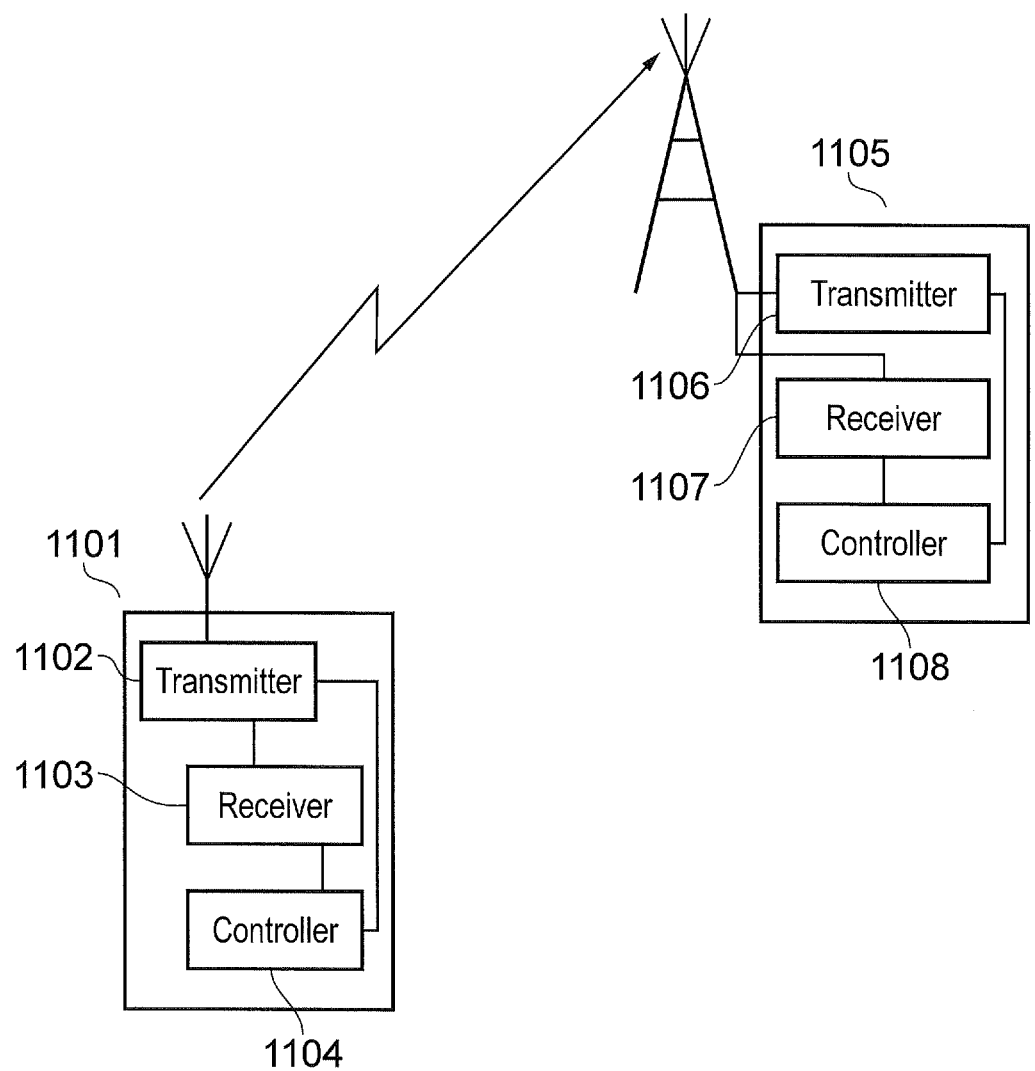
FIG. 11 provides a schematic diagram showing part of an adapted LTE mobile telecommunication network arranged in accordance with an example of the present invention.

FIG. 11 provides a schematic diagram of a UE 1101 and an eNodeB 1105 in which the techniques described above may be implemented. The UE includes a transmitter 1102 for transmitting data to the eNodeB 1105 and a receiver 1103 for receiving data from the eNodeB 1105. Under the control of a controller 1104 the transmitter 1102 and the receiver 1103 may allow the UE to transmit a preamble to the eNodeB and receive a random access response from the eNodeB 1105. The controller 1104 may also calculate the timing of when to transmit the preamble and select the eNodeB to which the preamble(s) should be transmitted. Although the UE 1101 has been illustrated as including the transmitter 1102, the receiver 1103 and the controller 1104, the UE 1101 is not limited to including these elements and may also include further elements such as memory for example. The eNodeB 1105 includes a transmitter 1006 for transmitting data to the UE 1101 and a receiver 1007 for receiving data from the UE 1101, under the control of a controller 1108. The controller 1108 may control process received preambles and control the transmitter to transmit random access responses. The controller may also control the transmitter to transmit signalling which indicates to the UE whether variable delay preamble transmission should be implemented and the relevant parameters of the variable delay preamble transmission. As for the UE, although the eNodeB 1105 has been illustrated as including a transmitter and a receiver, the eNodeB is not limited to including these elements and may also include further elements such as memory for example.

Various modifications can be made to examples of the present invention. Embodiments of the present invention have been defined largely in terms of reduced capability terminals transmitting data via a virtual carrier inserted in a conventional LTE based host carrier. However, it will be understood that any suitable device can transmit and receive data using the described virtual carriers for example devices which have the same capability as a conventional LTE type terminal or devices which have enhanced capabilities.

Furthermore, it will be understood that the general principle of inserting a virtual carrier on a subset of uplink or downlink resources can be applied to any suitable mobile telecommunication technology and need not be restricted to systems employing an LTE based radio interface.

Further particular and preferred aspects of the present invention are set out in the accompanying independent and dependent claims. It will be appreciated that features of the dependent claims may be combined with features of the independent claims in combinations other than those explicitly set out in the claims.

Some respective features of the present disclosure are defined by the following two groups of numbered paragraphs:

1. A communications device for communicating via a mobile communications network, the mobile communications network including one or more network elements providing a wireless access interface for transmitting signals to or receiving signals from the communications device, the communications device comprising: a transmitter configured to transmit the signals to the mobile communications network via the wireless access interface provided by the one or more network elements of the mobile communications network, and a receiver configured to receive the signals from the mobile communications network via the wireless access interface provided by the one or more network elements of the mobile communications network, and a controller configured to control the transmitter to transmit a random access message to a first network element via a random access channel of the wireless access interface which is common to one or more other communications devices, to receive from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein in response to detection of one or more random access failure conditions by the controller, the controller is configured in combination with the transmitter to retransmit the random access message one or more times, each retransmission of the random access message being after a variable delay which is greater than or equal to the delay of a previous retransmission.

2. A communications device according to paragraph 1, wherein each delay before the retransmission of the random access message is comprised of a delay randomly selected from between a minimum delay period and a maximum delay period, wherein the maximum delay period associated with each retransmission is greater than that of a previous retransmission.

3. A communications device according to paragraphs 1 or 2, wherein in response to the detection of one or more random access failure conditions by the controller, the controller is configured in combination with the receiver to select a second network element to which to transmit a subsequent random access message to, the second network element having been selected in accordance with a network element selection or reselection criterion.

4. A communications device according to paragraph 3, wherein the network element selection or reselection criterion includes a negative offset configured to be applied to a signal strength of signals received from the first network element, and the controller is configured in combination with the receiver and the transmitter to receive signals transmitted by the one or more network elements, to determine a signal strength of each of the received signals from each of the one or more network elements and establishes corresponding parameters associated with the selection or reselection criterion, to apply the negative offset to the parameter associated with the selection or reselection criterion associated with the first network element, and to select the second network element in accordance with the selection or reselection criterion associated with the respective network elements.

5. A communications device according to paragraph 4, wherein the offset has a size which has an effect of preventing reselection of the first network element.

6. A communications device according to any of paragraphs 1 to 5, wherein the controller in combination with the transmitter is configured to increase a power with which the random access message is retransmitted for each of the times which the random access message is retransmitted.

7. A communications device according to any of paragraphs 1 to 6, wherein the random access failure conditions include transmitting the random access message a predetermined number of times.

8. A communications device according to any of paragraphs 1 to 7, wherein the random access failure conditions include failing to receive within a predetermined time an acknowledgement providing an indication of an allocation of the shared up-link channel.

9. A communications device according to any of paragraphs 1 to 8, wherein the controller is configured in combination with the receiver to receive a broadcast message from the first network element, the broadcast message indicating one or more of the random access failure conditions.

10. A communications device according to any of paragraphs 1 to 9, wherein the random access message is retransmitted at a power less than or equal to a maximum transmit power.

11. A communications device according to any of paragraphs 1 to 8, wherein the controller is configured in combination with the receiver to receive a broadcast message from the first network element, the delay being calculated in accordance with a parameter indicated in the broadcast message.

12. A communications device according to any of paragraphs 1 to 8, wherein the controller is configured in combination with the receiver to receive a broadcast message from the first network element, a network element reselection criterion parameter being indicated in the broadcast message.

13. A method of communicating via a mobile communications network, the mobile communications network including one or more network elements providing a wireless access interface for transmitting signals to or receiving signals from the communications device, the method comprising: transmitting the signals to the mobile communications network via the wireless access interface provided by the one or more network elements of the mobile communications network, receiving the signals from the mobile communications network via the wireless access interface provided by the one or more network elements of the mobile communications network, the transmitting including transmitting a random access message to a first network element via a random access channel of the wireless access interface which is common to one or more other communications devices, receiving from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein in response to detection of one or more random access failure conditions, re-transmitting the random access message one or more times, each re-transmission of the random access message being after a variable delay which is greater than or equal to the delay of a previous re-transmission.

14. A method according to paragraph 13, wherein each delay before the retransmission of the random access message is comprised of a delay randomly selected from between a minimum delay period and a maximum delay period, wherein the maximum delay period associated with each retransmission is greater than that of a previous retransmission.

15. A method according to paragraph 13 or 14, comprising selecting, in response to detecting of one or more random access failure conditions, a second network element to which to transmit a subsequent random access message, the second network element having been selected in accordance with a network element selection or reselection criterion.

16. A method according to paragraph 15, wherein the network element selection or reselection criteria includes a negative offset to be applied to a signal strength of the signals received from the first network element, the method comprising receiving signals transmitted by the one or more network elements, determining a signal strength of each of the received signals from each of the one or more network elements and establishes corresponding parameters associated with the selection or reselection criterion, applying the negative offset to the parameter associated with the selection or reselection criterion associated with the first network element, and selecting the second network element in accordance with the selection or reselection criterion associated with the respective network elements.

17. A method according to paragraph 16, wherein the negative offset has a size which has an effect of preventing reselection of the first network element.

18. A method according to any of paragraphs 13 to 17, wherein the re-transmitting the random access message includes increasing a power with which the random access message is re-transmitted for each of the times which the random access message is re-transmitted.

19. A method according to any of paragraphs 13 to 18, wherein the random access failure conditions include transmitting the random access message a predetermined number of times.

20. A method according to any of paragraphs 13 to 19, wherein the random access failure conditions include failing to receive within a predetermined time an acknowledgement providing an indication of an allocation of the shared up-link channel.

21. A method according to any of paragraphs 13 to 20, comprising receiving a broadcast message from the first network element, the broadcast messages indicating one or more of the random access failure conditions.

22. A method according to any of paragraphs 13 to 21, wherein the transmitting the random access message includes retransmitting the random access message at a power less than or equal to a maximum power.

23. A method according to any of paragraphs 13 to 22, comprising receiving a broadcast message from the first network element, and calculating the delay in accordance with a parameter included in the broadcast message.

24. A method according to any of paragraphs 16 to 23, comprising receiving a broadcast message from the first network element, the broadcast message including an indication of a network element reselection criterion parameter.

The invention claimed is:

1. A communications device for communicating via a mobile communications network, the mobile communications network including one or more network elements providing a wireless access interface for transmitting signals to or receiving signals from the communications device, the communications device comprising:
a transmitter configured to transmit the signals to the mobile communications network via the wireless access interface provided by the one or more network elements of the mobile communications network, and
a receiver configured to receive the signals from the mobile communications network via the wireless access interface provided by the one or more network elements of the mobile communications network, and
a controller configured to control the transmitter
to transmit a random access message to a first network element via a random access channel of the wireless access interface which is common to one or more other communications devices, and
to receive from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein
in response to detection of one or more random access failure conditions by the controller, the controller is configured in combination with the transmitter to retransmit the random access message one or more times, each retransmission of the random access message being after a variable delay which is greater than or equal to the delay of a previous retransmission, and
in response to the detection of one or more random access failure conditions by the controller, the controller is further configured in combination with the receiver to select a second network element to which to transmit a subsequent random access message to, the second network element having been selected in accordance with a network element selection or reselection criterion.

2. A communications device as claimed in claim 1, wherein each delay before the retransmission of the random access message is comprised of a delay randomly selected from between a minimum delay period and a maximum delay period, wherein the maximum delay period associated with each retransmission is greater than that of a previous retransmission.

3. A communications device as claimed in Claim 1, wherein the network element selection or reselection criterion includes a negative offset configured to be applied to a signal strength of signals received from the first network element, and the controller is configured in combination with the receiver and the transmitter
to receive signals transmitted by the one or more network elements,
to determine a signal strength of each of the received signals from each of the one or more network elements and establish corresponding parameters associated with the selection or reselection criterion,
to apply the negative offset to the parameter associated with the selection or reselection criterion associated with the first network element, and
to select the second network element in accordance with the selection or reselection criterion associated with the respective network elements.

4. A communications device as claimed in claim 3, wherein the offset has a size which has an effect of preventing reselection of the first network element.

5. A communications device as claimed in claim 1, wherein the controller in combination with the transmitter is configured to increase a power with which the random access message is retransmitted for each of the times which the random access message is retransmitted.

6. A communications device as claimed in claim 1, wherein the random access failure conditions include transmitting the random access message a predetermined number of times.

7. A communications device as claimed in claim 1, wherein the random access failure conditions include failing to receive within a predetermined time an acknowledgement providing an indication of an allocation of the shared up-link channel.

8. A communications device as claimed in claim 1, wherein the random access message is retransmitted at a power less than or equal to a maximum transmit power.

9. A communications device as claimed in claim 1, wherein the controller is configured in combination with the receiver to receive a broadcast message from the first network element, the delay being calculated in accordance with a parameter indicated in the broadcast message.

10. A communications device for communicating via a mobile communications network, the mobile communications network including one or more network elements providing a wireless access interface for transmitting signals to or receiving signals from the communications device, the communications device comprising:
a transmitter configured to transmit the signals to the mobile communications network via the wireless access interface provided by the one or more network elements of the mobile communications network, and
a receiver configured to receive the signals from the mobile communications network via the wireless access interface provided by the one or more network elements of the mobile communications network, and
a controller configured to control the transmitter
to transmit a random access message to a first network element via a random access channel of the wireless access interface which is common to one or more other communications devices, and
to receive from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein
in response to detection of one or more random access failure conditions by the controller, the controller is configured in combination with the transmitter to retransmit the random access message one or more times, each retransmission of the random access message being after a variable delay which is greater than or equal to the delay of a previous retransmission, and
wherein the controller is configured in combination with the receiver to receive a broadcast message from the first network element, the broadcast message indicating one or more of the random access failure conditions.

11. A communications device for communicating via a mobile communications network, the mobile communications network including one or more network elements providing a wireless access interface for transmitting signals to or receiving signals from the communications device, the communications device comprising:
a transmitter configured to transmit the signals to the mobile communications network via the wireless access interface provided by the one or more network elements of the mobile communications network, and
a receiver configured to receive the signals from the mobile communications network via the wireless access interface provided by the one or more network elements of the mobile communications network, and
a controller configured to control the transmitter
to transmit a random access message to a first network element via a random access channel of the wireless access interface which is common to one or more other communications devices,
to receive from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein
in response to detection of one or more random access failure conditions by the controller, the controller is configured in combination with the transmitter to retransmit the random access message one or more times, each retransmission of the random access message being after a variable delay which is greater than or equal to the delay of a previous retransmission, and
wherein the controller is configured in combination with the receiver to receive a broadcast message from the first network element, a network element reselection criterion parameter being indicated in the broadcast message.

12. A method of communicating via a mobile communications network, the mobile communications network including one or more network elements providing a wireless access interface for transmitting signals to or receiving signals from the communications device, the method comprising:
transmitting the signals to the mobile communications network via the wireless access interface provided by the one or more network elements of the mobile communications network,
receiving the signals from the mobile communications network via the wireless access interface provided by the one or more network elements of the mobile communications network, the transmitting including
transmitting a random access message to a first network element via a random access channel of the wireless access interface which is common to one or more other communications devices,
receiving from the first network element an acknowledgement in response to the random access message providing an indication of an allocation of communications resources of a shared up-link channel for the communications device to transmit signals to the first network element or a negative acknowledgement providing an indication that the communications device has not been allocated communications resources of the shared up-link channel, wherein
in response to detection of one or more random access failure conditions, re-transmitting the random access message one or more times, each re-transmission of the random access message being after a variable delay which is greater than or equal to the delay of a previous re-transmission, and
further in response to the detection of one or more random access failure conditions, selecting a second network element to which to transmit a subsequent random access message to, the second network element having been selected in accordance with a network element selection or reselection criterion.

\* \* \* \* \*